3,767,791
DENTAL CREAM CONTAINING ABRASIVE AGGLOMERATES
Martin Cordon, Highland Park, and Brian J. Pintenich, Piscataway, N.J., assignors to Colgate-Palmolive Company, New York, N.Y.
No Drawing. Filed June 3, 1971, Ser. No. 149,786
Int. Cl. A61k 7/16
U.S. Cl. 424—49           7 Claims

ABSTRACT OF THE DISCLOSURE

Abrasive agglomerates and a method for making same is disclosed herein. The abrasive agglomerates comprise a plurality of particles of a mineral like hard abrasive substance held together in agglomerate form by a thermoplastic binding resin. The new agglomerates are very suitable for incorporation into various dental cream formulations to provide improved polishing characteristics and an attractive appearance.

---

The invention relates to aesthetically pleasing dentifrice formulations having improved cleaning and polishing characteristics. More specifically the invention provides a clear, opaque or translucent dental cream having dispersed therein agglomerate particles, each comprising a plurality of hard abrasive subparticles held together by a thermoplastic binding resin. For visual effect and to provide aesthetically pleasing characteristics the thermoplastic binding resin is preferably of a color that contrasts with the color of the dental creams.

The function of an abrasive substance in formulations intended for use in the oral cavity is to remove various deposits, including pellicle film from the surface of the teeth. Pellicle film is a tightly adherent film which often contains brown or yellow pigments and imparts an unsightly appearance to the teeth. An advantageous abrasive material for incorporation into the dental cream formulations should maximize film removal without causing undue abrasion to the hard tooth tissues. The typical soft abrasive used in dental creams, such as dicalcium phosphate and calcium pyrophosphate, although not unduly abrasive to tooth tissue are not as effective as the hard abrasives in removing these undesirable deposits from the teeth. However, hard abrasives can present serious problems when present in dental preparations since their outstanding abrasive characteristics are likely to cause undue abrasion to the oral hard tissues (enamel, dentin and cenmentum).

The successful use of these abrasive materials in prophylatic dental pastes, which are applied professionally and infrequently to the teeth is known in the art. A primary advantage of the present invention is the incorporation of hard abrasive materials into dental cream formulations meant for daily use, without causing undue abrasion to the dental tissues. Further, the invention provides novel agglomerates, including a large plurality of hard abrasive particles joined together by a thermoplastic binding resin, that are aesthetically pleasing when incorporated into a dental cream having color characteristics contrasting to the color of the agglomerates.

Hard abrasive materials, as contemplated by the invention, include those inorganic, mineral-like substances that are well known for their abrasive properties and have been used for many years as industrial polishing agents. Such materials are characterized by a hardness on the Mohs scale of between about 2 and about 10 (the maximum value), preferably greater than 5. For use in the dental cream formulations of the invention suitable hard abrasive particles should preferably have a particle size between about 0.1 and 10 microns although larger particles could be used successfully. Representatives of these materials are zirconium silicate ($ZrSiO_4$), silica (sand, quartz) ground glass (calcium silicate), silicon carbide (grit), pumice, alumina, ilmenite ($FeTiO_3$), $CeO_2$, $Fe_2O_3$ (hematite), $SnO_2$, Topaz (aluminum hydroxy fluoro silicate), and $TiO_2$. Any of the many other mineral substances, such as hard silicate minerals, found in nature or manufactured, which have the foregoing specified hardness and particle size requirements, can be used in accordance with the invention. However, zirconium silicate is preferred.

The preparation of hard abrasive particles suitable for use in accordance with the invention can be accomplished by conventional techniques well known in the art. For example, the preferred zirconium silicate particles can be obtained from the zirconium silicate ore by a ball milling technique in which a cylindrical or conical shell rotates on a horizontal axis which is charged with a grinding medium such as balls of steel, flint, or porcelain. The grinding is accomplished by the tumbling action of the balls on the material to be ground. Particles of zirconium silicate which are ball milled have relatively smooth surfaces and good cleaning and polishing action. The desired size particles can be isolated by conventional screening techniques.

Zirconium silicate, and other hard abrasive particles, may also be prepared by hammer milling. Hammer mills utilize a high speed rotary shaft having a plurality of hammers or beaters mounted thereon. The hammers may be T-shaped elements, bars, or rings fixed or pivoted in a housing containing grinding plates or liners. The grinding action results from the impact between the material being milled and the moving hammers. When zirconium silicate is milled by an attrition technique such as hammer milling, relatively rough, jagged particles are produced which have good cleaning and polishing action. Mixtures of ball and hammer milled zirconium silicate may also be advantageously used in this invention.

In accordance with the invention, a plurality of hard abrasive particles having a mean particle diameter between about 0.1 and 10.0 microns, or larger depending on the degree of grittiness desired in the final dental cream, are joined together by a thermoplastic binding resin to form a lesser plurality of abrasive agglomerates which are subsequently incorporated into a dental cream. The agglomerates can be white in color if the dental cream is colored or they may be colored by the addition of dye for use in either clear, white or colored dental creams.

The abrasive agglomerates, in accordance with the invention, can vary in particle size from about 100 to about 1,000 microns preferably 200 to 500 microns and are individually macroscopically visible when incorporated into a suitable dental cream formulation. From about 0.5 to about 10.0, preferably 2 to 5 percent by weight of the new agglomerates can be added to a suitable dental cream formulation to obtain the desired cleaning and aesthetic characteristics, although lesser or greater amounts may be used depending on the effect desired.

Suitable thermoplastic binding resins for use in accordance with the invention include the broad class of synthetic and natural resins classifiable as thermoplastic. Representative of this group are ethylenically unsaturated polymers such as polyethylene, polyvinyl chloride, copolymers of polyvinyl chloride and vinyl alcohol, vinyl acetate and vinylidene chloride, polystyrene, polymethylstyrene, synthetic rubbers such as styrenebutadiene copolymers and copolymers of alpha methyl styrene and vinyl toluene; polymethacrylates, such as polymethyl methacrylate, polyethyl methacrylate, polyisopropyl methacrylate, polyisobutyl methacrylate; polyacrylates; polyamides such as nylon; cellulosics such as acetates and butyrates; polycarbonates; phenoxys such as polymers of bis-phenol-A and epichlorohydrin; polymers of monomers containing at least 2 polymerisable groups such as polyallyl methacrylate and the polymers of the di-esters of methacrylic acid and ethylene glycol; coumarone-indene resins, and natural waxes such as carnauba and paraffin, and mixtures of the foregoing resins.

In accordance with a specific aspect of the present invention, advantageous results can be obtained by utilizing a thermoplastic binding resin have a molecular weight between about 1,000 and about 15,000. The hardness, expressed as tenths of mm. needle penetration 100 grams/5 sec./25° C. (ASTM D 1321), of preferred resins in this class is typically between about 1 and 15 although harder grades can be used if not objectionable in the final dental cream. The following table lists the properties of thermoplastic binding resins representative of this preferred class.

together by the thermoplastic binding resin. The desired size particles are then isolated by screening the particulate material through appropriate sieve screens. Generally, the portion of the particulate material passing through a 20 mesh (U.S. sieve series) and retained by a 60 mesh (U.S. sieve series) is suitable for use in accordance with the invention.

The agglomerates produced by the foregoing procedure are irregularly shaped and have a mean particle diameter between about 250 and 840 microns. Of course, any segment of this size range of particles can be further isolated for a particular application. Agglomerates having a mean particle diameter between about 250 and 420 microns are particularly advantageous.

In further accordance with the invention, novel abrasive agglomerates having a hollow core can be produced by the following procedure.

The thermoplastic resin and hard abrasive material are dry mixed with a coloring material, if desired, in a suitable vessel. The vessel containing the mixture is then placed in an appropriate heating apparatus and rotated at a speed sufficient to cause the mixture to tumble while being heated. The mixture is heated to the softening point of the resin while the vessel is rotating. After a short period of time small agglomerates begin to form in the rotating vessel, at which point the vessel is removed from the heat source and cooled. The cooled agglomerates can be sieved to isolate the desired size range.

The agglomerate particles resulting from the foregoing procedure are very unique in that they are spheroidal in

| Resin | Average molecular weight | Softening point, ° C. (approx.) | Hardness | Specific gravity | Average viscosity, cps. |
|---|---|---|---|---|---|
| Polyethylene | 2,000 | 105 | 3.5 | 0.92 | 200 (140° C.) |
| Do | 2,200 | 107 | 3.0 | 0.92 | 200 (140° C.) |
| Do | 3,500 | 116 | 1.0 | 0.93 | 350 (140° C.) |
| Do | 5,000 | 109 | 2.5 | 0.92 | 4,000 (140° C.) |
| Do | 1,500 | 102 | 7.5 | 0.91 | 145 (140° C.) |
| Do | 2,000 | 96 | 9.5 | 0.91 | 230 (140° C.) |
| Do | 3,500 | 95 | 7.0 | 0.92 | 500 (140° C.) |
| Oxidized polyethylene | 1,800 | 104 | 4.0 | 0.94 | 320 (125° C.) |
| Do | 3,000 | 106 | 3.0 | 0.94 | 1,200 (125° C.) |
| Do | 8,000 | 106 | 4.0 | 0.91 | 12,000 (150° C.) |
| Do | 12,000 | 110 |  | 0.91 |  |
| Polyamide* | 6,000–9,000 | 110 | 3 | 0.98 | 3,800 (150° C.) |
| Do.* | 6,000–9,000 | 110 | 4 | 0.98 | 2,200 (150° C.) |
| Do.* | 6,000–9,000 | 95 | 15 | 0.98 | 1,100 (150° C.) |
| Alpha methyl styrene-vinyl toluene copolymer | 1,000 | 100 |  |  | 3,500 (140° C.) |

*Produced from ethylene diamine in accordance with U.S. Pat. No. 2,379,413.

The foregoing resins are non-toxic, tasteless, and do not attack the material from which the packaging tube for the dental cream is constructed (usually aluminum or lead).

The new abrasive agglomerates are produced by first dry blending the thermoplastic binding resin in powder form, with the hard abrasive particles and a suitable coloring agent if coloring is desired. The weight ratio of thermoplastic resin to abrasive material can vary from about 1:9 to 9:1. The dry mixture is then placed in a heating apparatus and uniformly heated and mixed until the thermoplastic resin softens and begins to agglomerate. A suitable heating apparatus should provide substantially uniform heat to the dry mixture to avoid hot spots and actual melting of the thermoplastic material. Representative of suitable heating apparatus are heated fluidized sand baths and oil baths.

When the thermoplastic material begins to agglomerate i.e. before it becomes molten, it is removed from the heat source and cooled to a temperature below its softening point while still being mixed. The cooled mass is then ground to particulate form in a suitable apparatus such as a ball or hammer mill. Solid carbon dioxide can be added during the grinding step in order to prevent the temperature of the thermoplastic material from rising above its softening point from the heat generated during grinding. The resulting particulate material is in the form of the agglomerates of the hard abrasive material held shape with a hollow center core. The hollow core is surrounded by a solid shell of thermoplastic resin with some abrasive material and coloring material dispersed therein. On the surface of the solid shell, particles of thermoplastic resin having a mean particle diameter substantially smaller than the agglomerate size are located. The thermoplastic particles on the surface of the shell material have abrasive material and dye particles adhered thereto. Hollow agglomerates produced in accordance with the foregoing procedure are particularly advantageous for incorporation into dental cream formulations since they disintegrate very rapidly in the mouth during brushing and are therefore substantially impalpable during use.

As previously mentioned, the new abrasive agglomerates can be colored to contrast with the dental cream base. Any non-toxic dye of a suitable color can be used for this purpose. It is usually desirable to utilize a dye or pigment that is approved for drug and cosmetic use (D&C) or food, drug and cosmetic use (FD&C).

Representative of suitable dyes are the following D&C Red numbers 2, 3, 6, 7, 8, 9, 10, 11, 12, 13, 19, 31, 30, 31, 36 and 37, D&C Blue number 1, FD&C Blue number 1 and 2, FD&C Red numbers 1, 2 and 3, cosmetic green oxide and cosmetic red oxide. Pigments, known as lakes, of the foregoing dyes are also very suitable for use in coloring the new abrasive agglomerates. A pigment is generally defined as a finely powdered insoluble colored material i.e. a dye supported on a carrier, that is dispersed and suspended, as opposed to being dissolved in the medium to be colored.

The dentifrice formulation of the invention includes liquids and solids that are proportioned to form a cream mass of desired consistency which is extrudable from an aerosol container or a collapsible tube (for example aluminum or lead). In general, the liquids in the dental cream will comprise chiefly water, glycerine, aqueous solutions of sorbitol, propylene glycol, polyethylene glycol 400, etc. including suitable mixtures thereof. It is advantageous usually to use a mixture of both water and a humectant or binder such as glycerine or sorbitol. The total liquid content will generally be about 20 to 75 percent by weight of the formulation. It is preferred to use also a gelling agent in dental creams and gels such as the natural and synthetic gums and gum-like materials, for example, Irish moss, gum tragacanth, methyl cellulose, polyvinylpyrrolidone, hydrophilic colloidal carboxyvinyl polymers, such as those sold under the trademark Carbopol 934 and 940 and synthetic silicated clays such as those sold under the trademark Laponite CP and Laponite SP. These grades of Laponite have the formula $$[Si_8Mg_{5.1}Li_{0.6}H_{7.6}O_{24}]^{0.6-}Na^+_{0.6}$$

The solid portion of the vehicle is usually present in an amount up to about 10 percent preferably about 0.2 to 5 percent by weight of the formulation.

In addition to the new abrasive agglomerates, the formulation can also include a dentally acceptable, substantially water insoluble, polishing agent of the type commonly employed in dental creams. Representative polishing agents include, for example, dicalcium phosphate, tricalciuc phosphate,, insoluble sodium metaphosphate, aluminum hydroxide including hydrated alumina, colloidal silica, magnesium carbonate, calcium carbonate, calcium pyrophosphate, bentonite, etc. including suitable mixtures thereof. When employed, it is preferred to use the water insoluble phosphate salts as the polishing agent and more particularly insoluble sodium metaphosphate and/or a calcium phosphate such as dicalcium phosphate dihydrate in dental creams. When visually clear gels are employed, a polishing agent of colloidal silica, such as those sold under the trademark Syloid as Syloid 72 and Syloid 74 or under the trademark Santocel as Santocel 100 and synthetic alkali metal aluminosilicate complexes may be particularly useful, since they have refractive indices close to the refractive indices of gelling agent-liquid (generally including humectants such as glycerine and sorbitol) systems commonly used in dentrifrices. When employed, the total polishing agent content, including mineral-like polishing agent in the agglomerates is generally in amounts from about 20 to 75 percent by weight in a dental cream. In a visually clear gel the total amount of polishing agent is generally from about 5 to 50 percent by weight.

Organic surface-active agents are used in the compositions of the present invention to assist in achieving thorough and complete dispersion of the instant compositions throughout the oral cavity and render the instant compositions more cosmetically acceptable. The organic surface-active material may be anionic, nonionic, ampholytic, or cationic in nature, and it is preferred to employ as the surface-active agent a detersive material which imparts to the composition detersive and foaming properties. Suitable such detergents are water-soluble salts of higher fatty acid monoglyceride monosulfates, such as the sodium salt of the monosulfated monoglyceride of hydrogenated coconut oil fatty acids, higher alkyl sulfates, such as sodium lauryl sulfate, alkyl aryl sulfonates, such as sodium dodecyl benzene sulfonate, higher alkyl sulfoacetates, higher fatty acid ester of 1,2-dihydroxy propane sulfonates, and the substantially saturated higher aliphatic acyl amides of lower aliphatic amino carboxylic acid compounds, such as those having 12 to 16 carbon atoms in the fatty acid, alkyl, or acyl radicals, and the like. Examples of the last mentioned amides are N-lauroyl sarcosine, and hte sodium, potassium, and ethanolamine salts of N-lauroyl, N-myristoyl, or N-palmitoyl sarcosine which should be substantially free from soap or similar higher fatty acid material which tends to substantially reduce the effect of these compounds. The use of these sarcosinate compounds in the dentifrice compositions of the present invention is particularly advantageous since these materials exhibit a prolonged and marked effect in the inhibition of acid formation in the oral cavity due to carbohydrate breakdown in addition to exerting some reduction in the solubility of tooth enamel in acid solutions.

Other particularly suitable surface active materials include nonionic agents such as condensates of sorbitan monostearate with approximately 60 moles of ethylene oxide, condensates of ethylene oxide with propylene oxide, condensates of propylene glycol ("Pluronics") and amphoteric agents such as quaternized imidazole derivatives which are available under the trademark "Miranol" such as Miranol $C_2M$.

Various other materials may be incorporated in the dentifrice formulations of this invention. Examples thereof are coloring or whitening agents or dyestuffs, preservatives, silicones, chlorophyll compounds, ammoniated materials such as urea, diamoniumphosphate and mixtures thereof, and other constituents. These adjuvants are incorporated in the instant compositions in amounts which do not substantially adversely effect the properties and characteristics desired and are selected and used in proper amount depending upon the particular type of preparation involved.

The compositions of the present invention, may also contain a fluorine-containing compound having a beneficial effect on the care and hygiene of the oral cavity, e.g., diminution of enamel solubility in acid and protection of the teeth against decay. Examples thereof include sodium fluoride, stannous fluoride, potassium fluoride, potassium stannous fluoride ($SnF_2$–KF), potassium fluorozirconate, sodium hexafluorostannate, stannous chlorofluoride, and sodium monofluorophosphate. These materials, which dissociate or release fluorine-containing ions. Suitably may be present in an effective but nontoxic amount, usually within the range of about 0.1 to 1% by weight, based on the water soluble fluorine content thereof. Sodium fluoride, stannous fluoride, and sodium monofluorophosphate are particularly preferred, as well as mixturees thereof.

Antibacterial agents may also be employed in the oral preparations of the instant invention to provide a total content of such agents of up to about 5% by weight. Typical antibacterial agents include $N^1$-(4-chlorobenzyl)-$N^5$-(2,4-dichlorobenzyl) biguanide;
p-chlorophenyl biguanide;
4-chlorobenzhydryl biguanide;
4-chlorobenzhydrylguanylurea;
N-3-lauroxpropyl-$N^5$-p-chlorobenzylbiguanide;
1-(lauryldimethylammonium)-8-(p-chlorobenzyldimethylammonium) octane dichloride;
5,6-dichloro-2-guanidinobenzimidazole;
$N^1$-p-chlorophenyl-$N^5$-laurylbiguanide;
1,6-di-p-chlorophenyl biguanidohexane;
1,6-bis(2-ethylhexyl biguanido) hexane;
5-amino-1,3-bis(2-ethylhexyl)-5-methylhexahydropyrimidine;

and their non-toxic acid addition salts.

Synthetic finely divided pyrogenic silica such as those sold under the trademarks Cab-O-Sil M–5, Syloid 244, Syloid 266 and Aerosil D–200 may also be employed in amounts of about 1–5% by weight to promote thickening or gelling and to improve clarity of the dentifrice.

The taste of the new compositions may be modified by employing suitable flavoring or sweetening materials. Examples of suitable flavoring constituents include the flavoring oils, e.g. oils of spearmint, peppermint, wintergreen, sassafras, clove, sage, eucalyptus, marjoram, cinnamon, lemon and orange as well as sodium methylsalicylate. Suitable sweetening agents include sucrose, lactose, maltose, sorbitol, sodium cyclamate, perillartine and saccharine. Suitably, flavor and sweetening agents may together comprise from about 0.01 to 5% or more of the compositions of the instant invention. Additionally, the new dental formulations can be provided with the unusual, biting flavor of chloroform. Accordingly, instead of or in addition to the foregoing flavoring or sweetening materials, the new formulation can include up to about 5%, preferably between 1 and 5%, by weight of chloroform and chloroform flavoring.

It is desirable to adjust the pH of the dental cream formulations to the range of about 3 to 9 using such acids as citric, acetic, chloropropionic, malonic, formic, fumaric, methoxyacetic, and propionic or salts thereof. Lower pH's than 3 are generally undesirable for oral use. When stannous ions are present, the pH is preferably lower than about 5. The preferred pH range is 3.5 to about 5.0 when stannous ions are present and about 4.5 to about 7.0 in the absence of stannous ion.

The following specific examples are further illustrative of the nature of the present invention but it is understood that the invention is not limited thereto. Dental cream formulations are prepared in the usual manner, except as indicated, and all amounts and proportions are by weight except as otherwise indicated.

EXAMPLE 1

Colored abrasive agglomerates suitable for incorporation into various dental cream formulations are prepared in accordance with the following procedure:

20 parts of a non-emulsifiable grade of polyethylene having the following properties:

| | |
|---|---|
| Molecular weight | Approx. 1500 |
| Softening point, ° C. | 102 |
| Hardness | 7.5 |
| Density g./cc. | 0.91 |
| Viscosity cps. 140° C. Brookfield | 145 | are dry mixed with 80 parts of zirconium silicate ($ZrSiO_4$) in particulate form having a mean particle diameter of 1 micron, and a Moh hardness of 8 and 1 part of FD&C Red number 2 aluminum lake pigment in a suitable vessel. The vessel containing the dry mix is heated above the softening point in a suitable heating apparatus. The dry mix is stirred while being heated. When the softening point of the thermoplastic resin is reached and before the resin becomes molten, the vessel is removed from the heating apparatus and cooled while still being stirred. The cooled mass is then ground to particulate form in a blender type apparatus and screened. The fraction passing through a 40 mesh screen (U.S. series) and retained by a 60 mesh screen is collected for use in accordance with the invention. The collected agglomerates have a distinctive red color, a mean diameter between about 250 and 420 microns and can be advantageously combined with various dental creams to produce an aesthetically attractive dentifrice having improved polishing characteristics.

EXAMPLE 2

Example 1 is repeated using an oxidized polyethylene resin having a softening point of about 104° C. and an average molecular weight of about 1800 as the thermoplastic binding resin. The weight ratio of thermoplastic to abrasive is 1:3.

EXAMPLE 3

Example 1 is repeated using a polyamide resin having a softening point of 110° C. and an average molecular weight of between 6000 and 9000 as the thermoplastic binding resin. The weight ratio of thermoplastic to abrasive is 4:1.

EXAMPLE 4

Example 1 is repeated using an alpha methyl styrene-vinyl toluene copolymer resin having a softening point of about 100° C. and an average molecular weight of 1000 as the thermoplastic binding resin. The weight ratio of thermoplastic resin to abrasive is 1:7.

EXAMPLE 5

Example 1 is repeated using natural carnauba wax having a softening point between 81° C. and 86° C. as the thermoplastic binding resin. The weight ratio of thermoplastic resin to abrasive is 1:1.

EXAMPLE 6

The following procedure is used to produce novel abrasive agglomerate particles having a hollow core.

20 parts of the polyethylene material of Example 1 and 80 parts of the zirconium silicate material of Example 1 are dry mixed with 2 parts of D&C Red number 2 dye in a suitable vessel. The vessel containing the mixture is then placed in a fluidized sand bed heated to 105° C. and rotated at 80 r.p.m., causing the mixture to tumble. After a short period of time small agglomerates are visually observable in the heated and rotated vessel, at which point the vessel is removed from the heat source and cooled at room temperature. The cooled agglomerates are then sieved to isolate the fraction passing through a 40 mesh screen and retained on a 60 mesh screen. The collected agglomerates have a hollow core defined by a shell of polyethylene material having zirconium silicate and dye particles dispersed therein. A plurality of small particles of polyethylene containing zirconium silicate and dye particles and having a mean diameter between about 10 and 100 microns are located on the surface of the shell.

EXAMPLE 7

Example 6 is repeated using an oxidized polyethylene resin having a softening point of about 106° C. and an average molecular weight of 3,000 as the thermoplastic binding resin. The weight ratio of thermoplastic to abrasive is 1:8.

EXAMPLE 8

Example 6 is repeated using an alpha methyl styrene-vinyl toluene copolymer resin having a softening point of about 100° C. and an average molecular weight of 1,000. The weight ratio of thermoplastic to abrasive is 1:6.

EXAMPLE 9

Example 6 is repeated using natural carnauba wax having a softening point between 81° C. and 86° C. as the thermoplastic binding resin. The weight ratio of thermoplastic to abrasive is 1:9.

All of the foregoing examples produce abrasive agglomerates suitable for incorporation into a variety of dental cream formulations. Of course, the color of the agglomerates can be varied by using other suitable coloring materials. The degree of abrasiveness of the agglomerates can be varied by increasing or decreasing the weight ratio of thermoplastic to abrasive and by choosing a harder or softer abrasive material. In this regard suitable abrasive agglomerates can be produced by the procedure of Example 1 using as the abrasive material powdered alumina (mean particle size 6 microns, Moh hardness 8), powdered silica (mean particle size 5 microns), powdered $SnO_2$ (mean particle size 3 microns, Mohs hardness 6), powdered feldspar ($KAlSi_3O_8$, mean particle size 6 microns, Moh hardness 6) milled topaz (mean particle size 8 microns, Moh hardness 8), and ground Pyrex glass (mean particle size 10 microns, Moh hardness 7).

Specific dental cream formulations, with which abrasive agglomerates produced in accordance with foregoing examples can be combined, are described in the following examples. However, it should be appreciated that any of the abrasive agglomerates can be combined with any suitable dental cream base to produce a unique dentifrice having improved polishing characteristics.

EXAMPLE 10

A white, opaque dental cream having the following composition is formulated by the usual techniques.

| Components: | Parts |
| --- | --- |
| Glycerine | 25.63 |
| Tetra sodium pyrophosphate | 0.24 |
| Sodium carboxymethylcellulose | 0.74 |
| Saccharin, sodium | 0.19 |
| Sodium benzoate | 0.49 |
| Deionized water, irradiated | 14.57 |
| Calcium carbonate | 4.97 |
| Dicalcium phosphate | 46.14 |
| Sodium lauryl sulfate (dental grade) | 0.97 |
| Sodium N-lauroyl sarcosinate | 0.71 |

5 parts by weight of the abrasive agglomerates produced by the procedure of Example 1 are added to the foregoing dental cream formulation and uniformly dispersed therein.

The dental cream formulated in accordance with this example can be packaged in unlined aluminum tubes, has a very attractive appearance, and improves polishing and stain removing properties without unduly abrbading the dental hard tissues of the teeth. The dispersed agglomerates do not settle appreciably during normal shelf life and are substantially impalpable in the oral cavity during use.

EXAMPLE 11

A transparent dental cream having the following composition is formulated by the usual techniques.

| Components: | Parts |
| --- | --- |
| Glycerine | 25.00 |
| Sodium carboxymethylcellulose | 0.70 |
| Sodium saccharin | 0.17 |
| Sodium benzoate | 0.50 |
| Sorbitol (70%) | 44.83 |
| Dye solution | 0.80 |
| Water | 3.00 |
| Sodium aluminum silicate | 16.00 |
| Syloid 244 | 5.00 |
| Flavor | 1.00 |
| Sodium lauryl sulfate | 2.00 |
| Chloroform | 1.00 |

7 parts by weight of the abrasive agglomerates produced by the procedure of Example 6 are added to, and uniformly blended with the foregoing formulation. The resulting dentifrice has an aesthetically pleasing appearance and improved stain removing and polishing characteristics, without causing undue abrasion to the dental hard tissues of the teeth. Because of their hollow nature the agglomerates used in this formulation disintegrate almost immediately during use and are substantially impalpable in the oral cavity.

EXAMPLE 12

A dental cream formulation wherein polyvinyl chloride is the sole particulate component is prepared:

| Components: | Parts |
| --- | --- |
| Glycerine | 22.00 |
| Water | 28.50 |
| Polyvinyl chloride | 45.00 |
| Sodium carboxymethylcellulose | 1.00 |
| Sodium benzoate | 0.50 |
| Sodium lauryl sulfate | 2.00 |
| Sodium saccharine | 0.20 |
| Flavor | 0.80 |

To this formulation, 3 parts of the abrasive agglomerates of Example 1 were added and throughly mixed in to produce an advantageous dental cream in accordance with the invention.

EXAMPLE 13

The following visually clear dental cream is prepared:

| Components: | Parts |
| --- | --- |
| Sorbitol (70%) | 75.0 |
| Glycerine | 25.0 |
| Laponite SP | 2.0 |
| Sodium N-lauroyl sarcosinate | 2.0 |
| Sodium saccharin | 0.1 |
| Aerosil D200 | 3.0 |
| Sodium aluminumsilicate | 16.0 |
| Flavor | 1.0 |
| Color | 1.0 |
| Water | 20.0 |

The sodium aluminumsilicate employed in a complex having a refractive index of 1.46, a moisture content of about 6 percent, an average particulate size of about 35 microns and a sieve loose bulk density of about 0.07 g./cc.

2 parts by weight of the abrasive agglomerates of Example 11 are uniformly dispersed in the foregoing formulation to produce a dentifrice product in accordance with the invention.

All of the specilc formulations of the foregoing examples are aesthetically attractive to various degrees depending, of course, on the viewer's personal likes and dislikes. All of the foregoing formulations show a substantial improvement in the stain removing and polishing characteristics of the same dental cream with conventional dental cream abrasives in place of the new abrasive agglomerates without exhibiting significantly greater abrasion to the dental hard tissues of the teeth. Of course, the stain removing and polishing characteristics of the dental cream formulation containing the new agglomerates varies according to the type of hard abrasive used, its concentration in the agglomerates and the concentration of the agglomerates in the dental cream. However, all of the formulations in accordance with the invention show a significant improvement in stain removal without a significant increase in tooth abrasion. The presence in a dental cream of 5 percent by weight of agglomerates in accordance with the invention can raise the stain removal ability of the dental cream from about 30–40 percent to as high as 60–70 percent. This is particularly true in the case of visually clear dental creams. The polishing ability of the dentifrice usually improves a corresponding amount and abrasiveness to human dentin is not appreciably changed.

Although the foregoing specific examples include preferred and typical formulations, they should not be taken as limitations on the invention. Accordingly reference should be made to the following claims in determining the full scope of the invention.

What is claimed is:

1. In a dental cream formulation including a dispersion of macroscopically visible agglomerates, wherein said agglomerates comprise subparticles of dental polishing agents held together by a binding agent, the improvement characterized by said agglomerates having a central core substantially free from said dental polishing agent surrounded by a shell of binding agent and subparticles of dental polishing agent and said binding agent being chosen from the group consisting of carnauba wax, paraffin wax and thermoplastic binding agents having a molecular weight from about 1000 to about 15,000 and a hardness (ASTM 01321) from about 1 to about 15.

2. The improved formulation of claim 1, wherein said central core is hollow.

3. The improved formulation of claim 1, wherein said binding agent is polyethylene.

4. The improved formulation of claim 1 wherein said agglomerates have a particle size from about 100 to about 1000 microns and said subparticles of dental polishing agent have a particle size from about 0.1 to about 10 microns.

5. The improved formulation of claim 4 wherein said dental polishing agent has a Moh hardness from about 5 to about 10.

6. The improved formulation of claim 5 wherein said binding agent is chosen from the group consisting of polyethylene and oxidized polyethylene.

7. The improved formulation of claim 6 wherein said dental polishing agent is zirconium silicate.

References Cited

UNITED STATES PATENTS 3,574,823  4/1971  Roberts et al. _____ 424—49

OTHER REFERENCES

Chem. Abst. (1), vol. 54, entry 7008i, 1960.
Chem. Abst. (2), vol. 63, entry 1957b, 1965.
Chem. Abst. (3), vol. 72, entry 45319p, 1970.
Chem. Abst. (4), vol. 73, entry 67397k, 1970.

RICHARD L. HUFF, Primary Examiner